United States Patent Office 3,113,903
Patented Dec. 10, 1963

3,113,903
DESTROYING NEMATODES EMPLOYING
METHYL ISOTHIOCYANATE
Ernst-Albrecht Pieroh, Berlin-Frohnau, and Horst Werres, Berlin-Charlottenburg, Germany, assignors to Schering A.G., Berlin, Germany, a corporation of Germany
No Drawing. Filed Oct. 23, 1957, Ser. No. 691,793
Claims priority, application Germany Nov. 16, 1956
6 Claims. (Cl. 167—39)

This invention relates to novel soil disinfectants and to methods for their application. More particularly, this invention concerns the application of methyl isothiocyanate (methyl mustard oil) as a soil disinfectant for controlling soil dwelling nematodes and fungi.

It is known from the literature that various mustard oils exhibit nematocidal action. Thus, Smedley (J. Helminthol. (1939), vol. 1, pp. 31–38) carried out tests with phenyl-, ethyl-, n-butyl-, p-hydroxyphenyl-, o-tolyl, and p-tolyl-isothiocyanates and found that of these substances, phenyl isothiocyanate showed the highest activity. Furthermore, according to data in the literature, allyl isothiocyanate also shows good activity (Handbuch der Pflanzenkrankheiten, vol. VIb, 2nd Edition, page 248). In German Patent 438,400 mustard oils are suggested as a bait for addition to materials for combating beet nematodes. In all these literature articles, no mention is made of the use of methyl isothiocyanate.

Moreover, in a discussion explaining the nematodicidal action of the sodium salt of methyldithiocarbamic acid (Agricultural Chemicals, 1956, page 61) it has been assumed that in the soil this compound undergoes decomposition, whereby an active penetrating gas is generated, which is designated as "isothiocyanate." However, no indication is given in this work of the definition of the term "isothiocyanate." It cannot means methyl isothiocyanate, since that compound is a solid crystalline substance with a melting point of 35–37° C. and a boiling point of 118–120° C., and hence not a gaseous material. However, even though the aforesaid compounds had been known, it could not have been predicted either from the previously applied isothiocyanates, or from the existence of the product derived from the sodium salt of methyldithiocarbamate, that methyl isothiocyanate in particular would exhibit the outstanding and unexpected power to combat nematodes and fungi which was discovered for the first time in the invention disclosed herein.

Methyl isothiocyanate has been tested against ascaris of horses and found to be active (Chemical Abstracts, 1953, p. 1845b). Nevertheless such use is concerned with organisms in the skin of the animal, and not with the destruction of soil nematodes, an entirely different problem. It could not be deduced therefore that methyl isothiocyanate would possess outstanding activity against plant parasites present in the soil.

Despite their favorable action against soil nematodes, the various other mustard oils have heretofore found no practical utilization, since every one of the mustard oils previously proposed for this purpose is extremely toxic to plants.

It was now found, in accordance with this invention, that methyl isothiocyanate, which hitherto was not known to be a soil disinfectant, exhibits a far greater activity against soil dwelling nematodes and fungi than any of the mustard oils previously suggested for this purpose. It also far exceeds in effectiveness the conventional commercial preparations used as soil disinfectants, such as the sodium salt of N-methyldithiocarbamic acid, dichlorpropane-dichlorpropene mixtures, or ethylene dibromide. Even more surprising was the discovery that methyl isothiocyanate exhibits a high degree of compatibility with plants. This was especially unpredictable since it was precisely their excessively strong phytotoxic action which successfully militated against the adoption of the previously studied mustard oils. The methyl isothiocyanate agent of the present invention also displays excellent long-lasting action, which is far superior to that, for example, of the commercially used sodium N-methyldithiocarbamate.

Furthermore, methyl isothiocyanate also exhibits activity against harmful soil fungi, such as *Fusarium*, species *sectio elegans*, and *Pythium aphanidermatum*. A further advantage of methyl isothiocyanate as an agent for combating soil nematodes and fungi is the fact that its action is only slightly retarded by reduced temperatures.

The superior soil disinfectant action of the novel agent of this invention is demonstrated by the following two series of tests:

*Series 1.*—Test organism: Leaf nematode (*Aphelenchoides ritzemabosi*), larvae in vitro, evaluation after 20- Evaluation made in accordance with the activity of the humidity of soil 29.5%, soil temperature 19–21° C. Evaluation made in accordance with the activity of the larvae, from 0 to 100%; thus, effect with complete activity of larvae designated as 0%, while complete inactivity of larvae is designated as 100%.

Comparative results on inactivation of larvae between methyl isothiocyanate and other substances are shown in the following Table 1:

TABLE 1

| Concentration in One Liter of Soil | 100 mg. | 75 mg. | 50 mg. | 25 mg. | 20 mg. | 15 mg. | 10 mg. | 5 mg. |
|---|---|---|---|---|---|---|---|---|
| | (Figures are percentages) | | | | | | | |
| Methyl isothiocyanate | 100 | 100 | 100 | 100 | 100 | 100 | 100 | 100 |
| Sodium N-methyl-dithiocarbamate | 100 | 100 | 100 | 100 | 100 | 50 | 50 | 30 |
| Ethyl mustard oil | 100 | 100 | 100 | 98 | 80 | 70 | 50 | 50 |
| Allyl mustard oil | 100 | 100 | 100 | 98 | 30 | 0 | 0 | 0 |
| Dichlorpropane-dichlorpropene | 95 | 95 | 70 | 30 | | | | |
| Ethylene dibromide | 80 | 70 | 50 | 50 | | | | |
| p-Chlorphenyl mustard oil | 100 | 100 | 70 | 0 | 0 | | | |
| Phenyl mustard oil | 100 | 95 | 50 | 0 | 0 | | | |

It will be seen from the foregoing table that methyl isothiocyanate was 100% effective at concentrations from 100 mg. down to as little as 5 mg. per liter of test soil.

*Series 2.*—Greenhouse tests: Spot-resisting cucumber, Wiesmoor type. Corresponding results were obtained in greenhouse tests. Thus, the sodium methyldithiocarbamate ("Vapam") was compared with methyl isothiocyanate. The test conditions were: Period of time, March 26 to June 24; generally 75 liters of soil were treated; preparation used as sodium methyldithiocarbamate in the form of a 33% aqueous solution, and methyl isothiocyanate in the form of a 20% solution in xylene. Amount employed about 100 mg. per liter of soil in terms of pure compound; depth of soil in test vessel was 20 cm.; depth of injection 12 cm. Relative humidity was 26.5%; soil temperature until planting 13° C.; soil loosening 5 days following treatment; idle period between treatment and planting 11 days; number of repetitions 5, according to test series; period of culture 90 days; air temperature during culture 26–30° C.; soil temperature during culture 23–26° C.; humidity of air 80–95%; beginning of harvest, 52 days after planting.

The test organism: *Meloidogyne incognita* var. *acrita* (rootknot nematode).

The following test series were run:

A. Nematode-infested compost soil;
B. Compost soil;
C. Steamed compost soil;

D. Nematode-infested compost soil + methyl isothiocyanate treatment;

E. Nematode-infested compost soil + sodium dithiocarbamate treatment.

Evaluation was made in terms of:

(1) Number of harvested cucumbers per test series, in parentheses the figure per plant;

(2) Rootknot nemathode occurrence on the roots was evaluated in accordance with the following rating scheme: (number of nematodes per root):

| Rating: | Number of nematodes per root |
|---|---|
| 0 | None. |
| 1 | 1–20. |
| 2 | 21–40. |
| 3 | 41–60. |
| 4 | 61–80. |
| 5 | Over 80. |

The results of Series 2 tests are shown in Table 2:

TABLE 2

| Test Series | Number of Harvested Cucumbers | Rootknot Nematode Occurrence Rating |
|---|---|---|
| A. Nematode-infested compost soil | 0 (0) | 5 |
| B. Compost soil | 24 (4.8) | 0 |
| C. Steamed compost soil | 27 (5.4) | 0 |
| D. Nematode-infested compost soil + sodium dithiocarbamate treatment | 31 (6.3) | 2 |
| E. Nematode-infested compost soil + methyl isothiocyanate treatment | 33 (6.6) | 0 |

These figures clearly establish the superiority of methyl isothiocyanate as a nematode combating agent.

Between the 49th and 62nd culture day the cucumber plants standing in untreated infested soil all exhibited wilting phenomena. Two fungi were isolated from the diseased tissues of the wilted plants, which are known to be causes of wilt diseases, a *Fusarium* sp. of *sectio elegans*, as well as also *Pythium aphanidermatum*.

Since the compost soil without nematodes, in Series B, did not exhibit any wilting phenomena, it must be assumed that the fungi occur secondarily as weak parasites, favored by root wounds caused by strong nematode infestation.

The following Table 3 demonstrates the good plant compatibility of the novel agent of this invention. In Table 3 phytotoxicity studies were made on the salad variety of cucumber known as "May King." The idle time between seeding and final treatment was 2 days. The rating scheme employed in evaluating the various substances used in the compartive tests was as follows:

| Rating: | Significance |
|---|---|
| 0 | No injury, normal plant growth. |
| 1 | Slight injury. |
| 2 | Moderate injury. |
| 3 | Severe injury. |
| 4 | Very severe injury. |
| 5 | No plant growth. |

TABLE 3

| Concentration of Pure Compound per Liter of Soil | 100 mg. | 75 mg. | 50 mg. | 25 mg. |
|---|---|---|---|---|
| Methyl isothiocyanate | 0 | 0 | 0 | 0 |
| Phenyl mustard oil | 5 | 5 | 4 | 4 |
| p-Chlorphenyl mustard oil | 5 | 5 | 4 | 4 |
| Allyl mustard oil | 4 | 2 | 1 | 1 |
| Dichlorpropane-dichlorpropene | 4 | 4 | 4 | 4 |
| Ethylene dibromide | 4 | 3 | 3 | 3 |
| Sodium (N-methyldithiocarbamate) | 1 | 1 | 0 | 0 |
| Control (steamed compost soil) | 0 | 0 | 0 | 0 |

The necessary idle period is stated in the literature to be 4 weeks for dichlorpropane-dichlorpropene mixture, 3 to 4 weeks for ethylene dibromide, and 7 days for sodium N-methyldithiocarbamate. In employing the novel agent of this invention a considerably shorter idle time is necessary, a matter of great practical significance.

The duration of the action of the preparation of this invention was also compared with that of commercial sodium N-methyldithiocarbamate, using as test organisms Aphelenchoides, and *Meloidogyne incognita* var. *acrita*. The relative humidity of the soil was around 27%, its temperature about 20.5° C. There was used 100 mg. of compound per liter of soil, and after 24 hours, the test organisms were studied and the results evaluated. Afterward the test organisms were retreated. Tables 4 and 5 show the results obtained with Aphelenchoides, while Tables 6 and 7 set forth the results for Meloidogyne.

Using 100 mg. per liter of soil, the results obtained with Aphelenchoides were:

TABLE 4

| No. of Inactivated Organisms in Percent After (100 mg. per Liter of Soil) | Number of Days | | | | |
|---|---|---|---|---|---|
| | 1 | 2 | 3 | 4 | 5 |
| Methyl isothiocyanate | 100 | 100 | 100 | 100 | 100 |
| Sodium N-methyl dithiocarbamate | 100 | 100 | 60 | 40 | 30 |

Using 50 mg. per liter of soil, the following results with Aphelenchoides were obtained:

TABLE 5

| No. of Inactivated Organisms in Percent After (50 mg. per Liter of Soil) | Number of Days | | | | |
|---|---|---|---|---|---|
| | 1 | 2 | 3 | 4 | 5 |
| Methyl isothiocyanate | 100 | 100 | 50 | 50 | 30 |
| Sodium N-methyldithiocarbamate | 100 | 30 | 0 | 0 | 0 |

Using 100 mg. of agent per liter of soil, the results obtained with Meloidogyne were:

TABLE 6

| No. of Inactivated Organisms in Percent After (100 mg. per Liter of Soil) | Number o Days | | | | |
|---|---|---|---|---|---|
| | 1 | 2 | 3 | 4 | 5 |
| Methyl isothiocyanate | 100 | 100 | 100 | 100 | 100 |
| Sodium N-methyldithiocarbamate | 100 | 100 | 90 | 30 | 0 |

Using 50 mg. of agent per liter of soil, the results obtained with Meloidogyne were:

TABLE 7

| No. of Inactivated Organisms in Percent After (50 mg. per Liter of Soil) | Number of Days | | | | |
|---|---|---|---|---|---|
| | 1 | 2 | 3 | 4 | 5 |
| Methyl isothiocyanate | 100 | 100 | 100 | 50 | 30 |
| Sodium N-methyldithiocarbamate | 100 | 0 | 0 | 0 | 0 |

The nematocidal action of sodium N-methyldithiocarbamate and methyl isothiocyanate with reference to varying soil temperatures was studied with relation to three test organisms: *Aphelenchoides r.* (leaf nematode), *Ditylenchus dips.* (bulb nematode), and *Meloidogyne sp.* (rootknot nematode).

The amounts applied ranged from 4 to 14 mg. of pure compound per 1000 cc. of soil; mode of application by injecting 5% solution into the middle portion of the test vessel; relative humidity of the soil 15%; soil temperatures were (*a*) 20° C., (*b*) 10° C., and (*c*) 3° C., respectively. Evaluation was made according to the activity of the larvae after 16 hours' treatment time, in number of inactive organisms expressed in percent. The soil to be tested was brought to the stated test temperature about 4 hours prior to applying the agent. The results for the three test organisms are shown in Tables 8, 9, and 10, as follows:

TABLE 8

*Ditylenchus dips.*

| Agent | Temp., °C. | (No. of Inactive Organisms in Percent) | | | | | |
|---|---|---|---|---|---|---|---|
| | | 14 mg. | 12 mg. | 10 mg. | 8 mg. | 6 mg. | 4 mg. |
| Sod. methyl dithiocarbamate | 20 | 100 | 100 | 70 | 50 | 30 | 30 |
| | 10 | 95 | 70 | 50 | 30 | 30 | 30 |
| | 3 | 70 | 30 | 0 | 0 | 0 | 0 |
| Methyl isothiocyanate | 20 | 100 | 100 | 100 | 98 | 70 | 30 |
| | 10 | 100 | 100 | 100 | 95 | 50 | 30 |
| | 3 | 100 | 100 | 100 | 80 | 70 | 30 |

TABLE 9

*Aphelenchoides r.*

| Agent | Temp., °C. | (No. of Inactive Organisms in Percent) | | | | | |
|---|---|---|---|---|---|---|---|
| | | 14 mg. | 12 mg. | 10 mg. | 8 mg. | 6 mg. | 4 mg. |
| Sod. methyl dithiocarbamate | 20 | 100 | 100 | 98 | 30 | 30 | 30 |
| | 10 | 98 | 90 | 80 | 30 | 30 | 0 |
| | 3 | 70 | 30 | 0 | 0 | 0 | 0 |
| Methyl isothiocyanate | 20 | 100 | 100 | 100 | 100 | 98 | 50 |
| | 10 | 100 | 100 | 100 | 100 | 70 | 50 |
| | 3 | 100 | 100 | 98 | 70 | 70 | 30 |

TABLE 10

*Meloidogyne sp.*

| Agent | Temp., °C. | (No. of Inactive Organisms in Percent) | | | | | |
|---|---|---|---|---|---|---|---|
| | | 14 mg. | 12 mg. | 10 mg. | 8 mg. | 6 mg. | 4 mg. |
| Sod. methyldithiocarbamate | 20 | 100 | 100 | 100 | 90 | 95 | 95 |
| | 10 | 100 | 70 | 70 | 30 | 30 | 30 |
| | 3 | 80 | 30 | 30 | 30 | 0 | 0 |
| Methyl isothiocyanate | 20 | 100 | 100 | 100 | 100 | 100 | 70 |
| | 10 | 100 | 100 | 100 | 100 | 100 | 70 |
| | 3 | 100 | 100 | 100 | 90 | 90 | 50 |
| Control | 20 | 0 | 0 | 0 | 0 | 0 | 0 |
| | 10 | 0 | 0 | 0 | 0 | 0 | 0 |
| | 3 | 0 | 0 | 0 | 0 | 0 | 0 |

The data assembled in Tables 8, 9, and 10 indicate that the nematocidal action of methyl isothiocyanate, as compared with that of sodium methyldithiocarbamate, is relatively independent of soil temperature.

In addition, tests were carried out on the destruction of harmful soil fungi, in which again comparisons were made with sodium methyldithiocarbamate. For spore germination tests there was used a *Fusarium oxysporum*, which was isolated from the root stem of a wilt-diseased pea plant (*Pisum sativum*). Accordingly, the tests deal with a Fusarium which acts on soil and which causes wilting.

A portion of a suspension of Fusarium spores held in the loop of a platinum wire was placed in a small dish together with 0.5 cc. of double distilled water. This small dish was placed in glass vessels which contained 1 liter of soil. The relative humidity of the soil was about 10%. The amounts of agent indicated in Table 11 were placed at the bottom of the glass vessels. The glass vessels were kept for 16 hours at 20° C. in a sealed condition. The control of spore germination after this period of time gave the results shown in Table 11.

TABLE 11

*Percent Germination of* Fusarium Oxysporum *Spores*

| Amount of Agent in mg. | After 16 hrs. | | After 3 Days [1] | |
|---|---|---|---|---|
| | Sod. Methyl-dithiocarbamate | Methyl Isothiocyanate | Sod. Methyl-dithiocarbamate | Methyl Isothiocyanate |
| 2 | 63 | 0 | | |
| 4 | 0 | 0 | | |
| 6 | 0 | 0 | | |
| 8 | 0 | 0 | 79 | 33 |
| 10 | 0 | 0 | | |
| 12 | 0 | 0 | | |
| 14 | 0 | 0 | | |
| 16 | 0 | 0 | | |
| 18 | 0 | 0 | | |
| 20 | 0 | 0 | 31 | 9 |
| Control | 94 | | 94 | |

[1] The small dishes were removed from the glass vessels after 16 hours and the further time taken in Petri dishes.

From the foregoing tests it is evident that methyl isothiocyanate is destructive of harmful soil fungi such as *Fusarium oxysporum*. The new agent is also superior in its fungicidal action against these soil parasites to the sodium salt of methyldithiocarbamate.

Methyl isothiocyanate exhibits in many cases a marked plant growth stimulating and yield increasing activity, where soil nematodes or harmful soil fungi cannot be directly detected. Apparently, other harmful soil organisms are destroyed by methyl isothiocyanate as well. Methyl isothiocyanate can therefore serve quite generally as a new soil disinfectant with superior characteristics.

The manufacture of methyl isothiocyanate, which is a known compound, may be carried out according to conventional methods. It can be prepared, for example, by the transformation of methyl thiocyanate, by molecular re-arrangement.

Methyl isothiocyanate may be applied for the destruction of nematodes and fungi in any suitable form. It can be used either as such or in parasiticidal amounts in solutions of any desired concentration. Although the concentration of the solution may have its upper limit the solubility of the methyl isothiocyanate in the particular solvent, it may be present in a wide range of concentrations below this limit. Thus fairly dilute solutions may be employed. The choice of solvents and concentrations is directed toward providing, in the soil to be disinfected, a minimal amount of about 15 to 20 mg. of methyl isothiocyanate per liter of soil.

A large number of solvents may be used for the preparation of disinfectant solutions of methyl isothiocyanate, for which the only requirement is that they be inert toward this compound. As examples of suitable solvents there may be mentioned: methylene chloride, ethylene chloride, trichlorethylene, chloroform, carbon tetrachloride, among the chlorinated aliphatic solvents, as well as also benzene, chlorbenzene, 1,2,4-trichlorbenzene, nitrobenzene, carbon bisulfide, acetone, acetonitrile, benzine, hexane, toluene, xylene, and other hydrocarbon types of solvents, or mixtures of the foregoing organic solvents.

Examples of typical solutions of methyl isothiocyanate in organic solvents may include the following (by weight):

20% methyl isothiocyanate and 80% xylene
40% methyl isothiocyanate and 60% xylene
30% methyl isothiocyanate and 70% xylene
30% methyl isothiocyanate and 70% methylene chloride
50% methyl isothiocyanate and 50% methylene chloride
5% methyl isothiocyanate and 50% toluene and 45% benzene
80% methyl isothiocyanate and 10% carbon tetrachloride and 10% tetrachlorethylene Methyl isothiocyanate may also be applied in the form of an emulsion. For this purpose any suitable type of emulsifying agent may be employed, of which the following examples are mentioned, but are not to be regarded as limiting: alkylphenolpolyglycol ethers (Type IVD) with a medium degree of hydroxyethylation, or Type SBK, with a lower degree of hydroxylation; Atlox 81 (polyoxyethylene sorbitan mono-oleate); Atlox 2065 and 2085 (sulfonated oil with polyoxyethylene sorbitol ester.

The following examples illustrate types of compositions in which methyl isothiocyanate may be applied, but the invention is not to be considered as limited thereto.

EXAMPLE 1

An emulsion was prepared by admixing the following ingredients:

| | Percent |
|---|---|
| Methyl isothiocyanate | 20 |
| Alkylphenolpolyglycol ether (emulsifier) | 30 |
| Xylene solvent | 50 |
| | 100 |

Upon injecting 0.125 cc. of this mixture into 1 liter of soil, there is obtained a 100% destructive action against the nematode *Meloidogyne incognita* var. *acrita* (rootknot nematode). By use of 0.5 cc. of mixture per liter of soil 100% action is obtained against the cysts of *Heterodora rostochiensis*.

EXAMPLE 2

A solution is prepared by dissolving methyl isothiocyanate in acetone to obtain a mixture of 10% of the agent and 90% acetone. This is applied to soil in amounts of 1 cc. per liter of soil. The agent shows 100% action against the cysts of *Heterodora rostochiensis* and also against *Meloidogyne incognita* var. *acrita*.

EXAMPLE 3

A mixture is prepared from 20% methyl isothiocyanate, 20% alkylphenolpolyglycol ether emulsifier, and 60% xylene. This mixture may be diluted with water prior to use.

EXAMPLE 4

A mixture is prepared from 30% methyl isothiocyanate, 25% Atlox (polyoxyethylene sorbitan mono-oleate), and 45% methylene chloride. This mixture can also be diluted with water before use.

EXAMPLE 5

A mixture is prepared from 50% methyl isothiocyanate, 10% SBK emulsifier (alkylphenolpolyglycol ether with a low degree of hydroxyethylation), and 40% carbon bisulfide. This mixture may be diluted with water if desired before use.

We claim:

1. A method for controlling soil dwelling nematodes which comprises impregnating nematode infested soil with a parasiticidal amount of methyl isothiocyanate.
2. A method for controlling soil dwelling nematodes which comprises impregnating nematode infested soil with a composition comprising methyl isothiocyanate as an active ingredient together with an inert diluent as a carrier therefor.
3. A method for controlling soil dwelling nematodes which comprises impregnating nematode infested soil with a composition comprising a solution of methyl isothiocyanate in xylene.
4. A method for controlling soil dwelling nematodes which comprises impregnating nematode infested soil with a composition comprising a solution of methyl isothiocyanate in acetone.
5. A method for controlling soil dwelling nematodes which comprises impregnating nematode infested soil with a composition comprising methyl isothiocyanate in association with an organic solvent and an emulsifying agent acting as a carrier therefor.
6. A composition for controlling soil dwelling nematodes which comprises methyl isothiocyanate in association with an organic solvent and an emulsifying agent acting as a carrier therefor.

References Cited in the file of this patent

UNITED STATES PATENTS

| | | |
|---|---|---|
| 2,377,446 | Payne | June 5, 1945 |
| 2,419,073 | Hammer | Apr. 15, 1947 |
| 2,448,265 | Kagy | Aug. 31, 1948 |
| 2,473,984 | Bickerton | June 21, 1949 |
| 2,502,244 | Carter | Mar. 28, 1950 |
| 2,543,580 | Kay | Feb. 27, 1951 |
| 2,695,859 | Hilmer | Nov. 30, 1954 |
| 2,701,224 | Stansbury | Feb. 1, 1955 |
| 2,769,745 | Hardy | Nov. 6, 1956 |
| 2,779,680 | Wolf | Jan. 29, 1957 |
| 2,794,727 | Barrons | June 4, 1957 |
| 2,809,983 | Heininger | Oct. 15, 1957 |

OTHER REFERENCES

Cupples et al.: Jour. of Ecc. Ent., June 1936, vol. 29, No. 3, pages 611–618 (617 relied on).

Frear: A Catalogue of Insecticides and Fungicides, 1948, vol. I, page 76.

Frear: Chemistry of Insecticides, Fungicides and Herbicides, 2nd Ed., September 1948, pages 108–122.

Brown: A.W.A., Insect Control by Chemicals, Wiley and Sons, 1951, page 3.